United States Patent
Lee

(10) Patent No.: US 8,131,276 B2
(45) Date of Patent: Mar. 6, 2012

(54) METHOD FOR EXTRACTING CONTENT, CONTENT EXTRACTION SERVER BASED ON RSS AND APPARATUS FOR MANAGING THE SAME AND SYSTEM FOR PROVIDING STANDBY SCREEN OF MOBILE COMMUNICATION TERMINAL USING THE SAME

(75) Inventor: Changseok Lee, Seoul (KR)

(73) Assignee: Insprit Co., Ltd. (KR)

( * ) Notice: Subject to any disclaimer, the term of this patent is extended or adjusted under 35 U.S.C. 154(b) by 840 days.

(21) Appl. No.: 12/090,748

(22) PCT Filed: Oct. 19, 2006

(86) PCT No.: PCT/KR2006/004248
§ 371 (c)(1),
(2), (4) Date: Aug. 26, 2008

(87) PCT Pub. No.: WO2007/046638
PCT Pub. Date: Apr. 26, 2007

(65) Prior Publication Data
US 2009/0042549 A1   Feb. 12, 2009

(30) Foreign Application Priority Data
Oct. 20, 2005   (KR) .................. 10-2005-0099226

(51) Int. Cl.
H04L 29/08   (2006.01)

(52) U.S. Cl. ............. 455/414.4; 455/414.1; 455/414.3; 455/566; 455/3.06

(58) Field of Classification Search .... 455/414.1–414.4, 455/3.06, 466, 566; 709/203
See application file for complete search history.

(56) References Cited

U.S. PATENT DOCUMENTS
7,574,170 B2 *  8/2009  Jendbro .................... 455/3.06

(Continued)

FOREIGN PATENT DOCUMENTS
WO   0207013   1/2002
WO   2005/089336   9/2005

(Continued)

OTHER PUBLICATIONS

European Search Report for corresponding EP 06122567 dated Jun. 18, 2007.

(Continued)

*Primary Examiner* — Sharad Rampuria
(74) *Attorney, Agent, or Firm* — Cantor Colburn LLP

(57) ABSTRACT

The present invention relates to a method for extracting a content, a content extraction server based on RSS and an apparatus for managing the same and a system for providing a standby screen of a mobile communication terminal using the same. a system for providing a standby screen of a mobile communication terminal based on a RSS, the system in accordance with an embodiment of the present invention comprises at least one content server for providing an update content consisting of a RSS feed; a content extraction server for collecting, analyzing and classifying the update content to form a mobile content by converting at least one of a size and a data format thereof; a database for storing the mobile content; and a standby screen providing server for providing the mobile content stored in the database to the mobile communication terminal, wherein the content extraction server comprises a RSS aggregator for collecting the update content consisting of the RSS feed, a content aggregator for partially extracting a tag of the update content, and a content transcoder for converting at least one of the size and the data format to form a user content so as to be applicable to the mobile communication terminal having the extracted tag transmitted thereto.

In accordance with the embodiment of the present invention, an information updated from various contents having the RSS scheme applied thereto at a desired time via an more convenient method, and various systems and methods based on the RSS are supported.

32 Claims, 14 Drawing Sheets

U.S. PATENT DOCUMENTS

| | | | |
|---|---|---|---|
| 7,684,815 B2 * | 3/2010 | Counts et al. | 455/518 |
| 7,693,528 B2 * | 4/2010 | Teppo et al. | 455/466 |
| 7,702,318 B2 * | 4/2010 | Ramer et al. | 455/414.2 |
| 7,774,425 B2 * | 8/2010 | Jin et al. | 709/217 |
| 7,913,247 B2 * | 3/2011 | Diederichs | 717/173 |
| 7,933,958 B2 * | 4/2011 | Carr et al. | 709/206 |
| 2002/0045436 A1 * | 4/2002 | Ekanayake et al. | 455/406 |
| 2003/0004880 A1 | 1/2003 | Banerjee et al. | |
| 2005/0165615 A1 | 7/2005 | Minar | |
| 2006/0052089 A1 * | 3/2006 | Khurana et al. | 455/414.1 |
| 2006/0128364 A1 * | 6/2006 | Costa-Requena et al. | 455/414.3 |
| 2007/0207782 A1 * | 9/2007 | Tran | 455/414.1 |
| 2007/0225047 A1 * | 9/2007 | Bakos | 455/566 |
| 2008/0009272 A1 * | 1/2008 | Toledano | 455/414.1 |
| 2008/0039010 A1 * | 2/2008 | Vance et al. | 455/3.06 |
| 2009/0117925 A1 * | 5/2009 | De Bonis et al. | 455/466 |

OTHER PUBLICATIONS

Written Opinion of the examiner for corresponding EP 06122567.

Alejandro Abdelnur et al., "Beyond Blogging:Feed Syndication and Publishing With Java Technology" Internet, [online] Jun. 30, 2005, pp. 1-20, XP-002438032, JavaOne 2005 Conference, San Francisco, USA.

M.F.Wyle, "A Wide Area Network Information Filter" Proceedings International Conference Artificial Intelligence on Wall Street, Oct. 9, 1991, New York, Los Alamitos, CA, US, XP 000534152.

B. Hammersley, "Content Syndication with RSS, Chapter 9—Using Feeds, Chapter 10—Directories, Web Aggregators, and desktop Readers" Content Syndication with RSS, O'Reilly & Associates, Inc.,, US, Mar. 2003, pp. 1-24 XP-002414834.

International Search Report Form PCT/ISA/210 for PCT/KR2006/004248 dated on Jan. 22, 2007.

Takashi Nagao "Change over the contents freely (Semantic Transcoding)", Japan IBM; Nikkei Electronics May 22, 2000, vol. 770, p. 165-176 with English abstract.

"What is RSS Reader?"; Windows Sarver World, Jan. 2005, p. 72-74, Published by IDG Japan with English abstract.

* cited by examiner

[Figure 2]
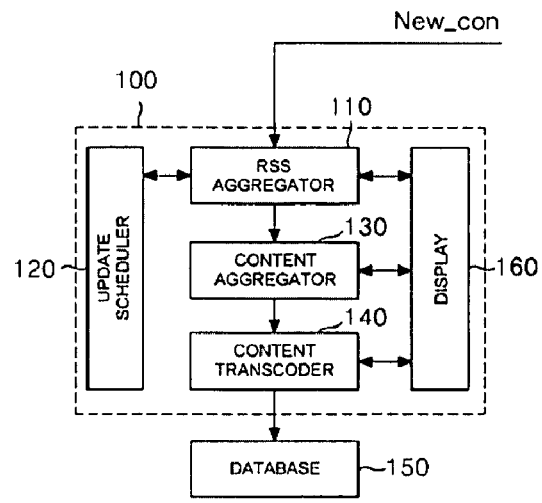
[Figure 3]
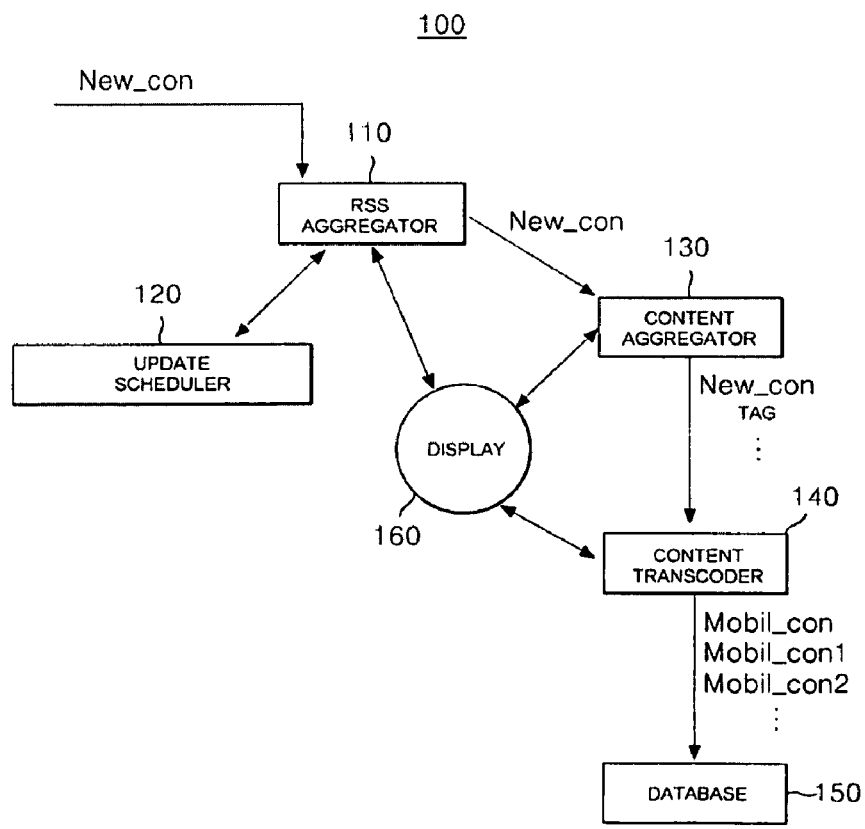

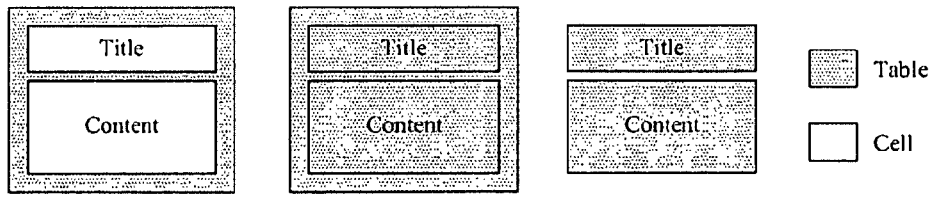

[Figure 8]

| CONDITION | SCORE |
|---|---|
| The width of a tag in table structure is the largest excluding a title portion | 50 |
| A text is written in a predetermined font and has a size larger than 50 characters. | 20 |
| A tag beginning with H1 has high possibility of being a title. | 5 |
| Not exist the value of height. | 5 |
| Not exist a background color | 3 |
| A link exists, but JAVA Script doesn't exist | 2 |
| Exist a format related with a date. | 1 |
|  |  |

[Figure 9]
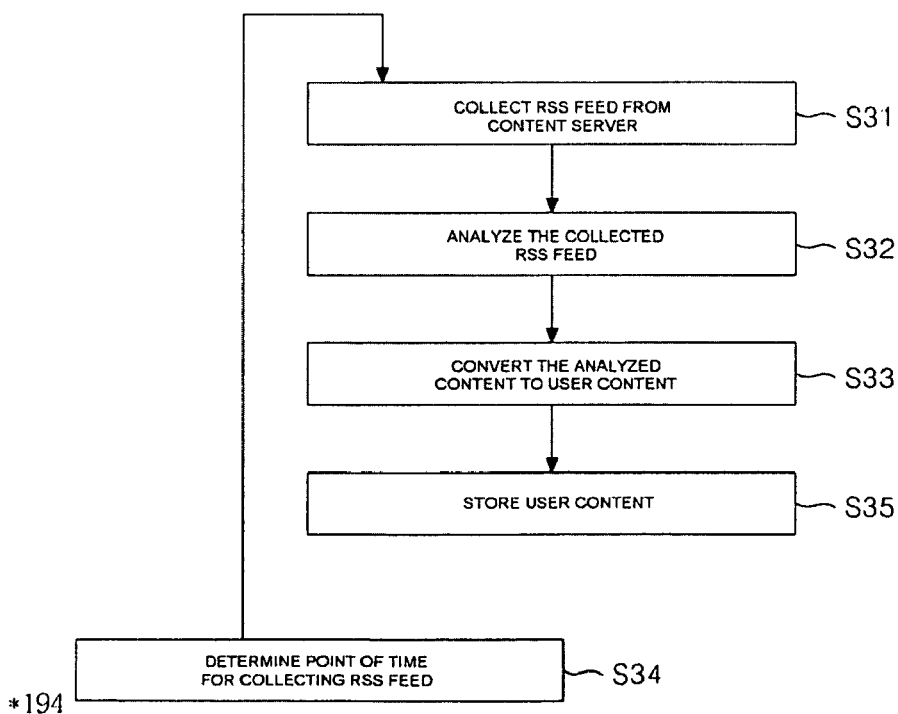
[Figure 10]

[Figure 11]
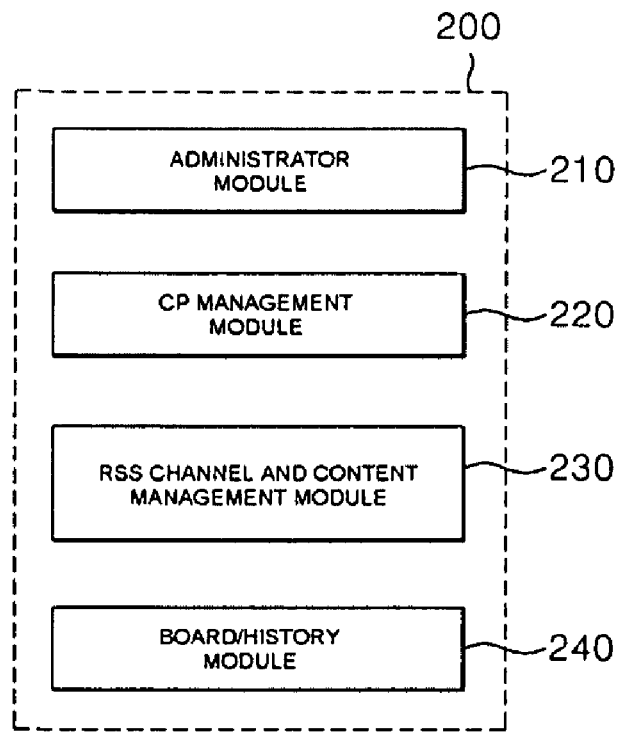
[Figure 12]
| NO | FIELD |
|---|---|
| 1 | ID |
| 2 | PASSWORD |
| 3 | Name |
| 4 | POST AND GROUP (2Depth) |
| 5 | PHONE NUMBER |
| 6 | MOBILE PHONE NUMBER |
| 7 | EMAIL |
| 8 | RANK, NO PRIVILEGE (ACCOUNT SUSPENDED) |
| 9 | REGISTRATION DATE |
| 10 | SECESSION DATE |
| 11 | APPROVAL DATE |

[Figure 13]

| Logo | | | Main page | logout |
|---|---|---|---|---|

Administrator Table (Required Field)

| Name | Administrator 1 | |
|---|---|---|
| ID | Xfinit | Change |
| Password | ****** | Change |
| Post | Project Team / Project 1 | |
| Cell phone | 011-0000-0000 | |
| E-mail | Xfinit@com.com | |

[OK]

Enter newpassword

| current password | |
|---|---|
| new password | |
| password again | |

[submit] [cancel]

[Figure 14]

| NO | FIELD | PRIVILEGE |
|---|---|---|
| 1 | ACCOUNT MANAGEMENT | REGISTER, MODIFY, DELETE, APPROVE |
| 2 | GROUP MANAGEMENT | REGISTER, MODIFY, DELETE, APPROVE |
| 3 | CP MANAGEMENT | REGISTER, MODIFY, DELETE, APPROVE, TEMPORARILY INTERRUPT(SET STATE) |
| 4 | RSS CHANNEL MANAGEMENT | REGISTER, MODIFY, DELETE, APPROVE, TEMPORARILY INTERRUPT(SET STATE) |
| 5 | CONTENT MANAGEMENT | REGISTER, MODIFY, DELETE, APPROVE, TEMPORARILY INTERRUPT(SET STATE) |
| 6 | CATEGORY MANAGEMENT | REGISTER, MODIFY, DELETE, MOVE CHANNEL |
| 7 | PATTERN | MODIFY PATTERN |
| 8 | BOARD | WRITE, READ AND DELETE (ALL POST, PRIVATE POST) |
| 9 | HISTORY | READ |
| 10 | PRIVILEGE MANAGEMENT | ADD RANKING/SET PRIVILEGE, CHANGE RANKING PRIVILEGE, GRANT RANK/PRIVILEGE |

[Figure 15]

| NO | FIELD |
|---|---|
| 1 | CP Account (ID) |
| 2 | Password |
| 3 | Company name |
| 4 | Representative phone number |
| 5 | Nationality |
| 6 | Company address |
| 7 | Content name |
| 8 | Website |
| 9 | Connection name |
| 10 | Phone number of person in charge |
| 11 | Mobile phone number of person in charge |
| 12 | E-mail |
| 13 | Description |
| 14 | Registration date |
| 15 | Expiration date |
| 16 | Approval date |
| 17 | Current state ( waiting for approval, in service, temporarily interrupted, contract expired ) |

| Logo | | | Main page ǀ logout |
|---|---|---|---|
| Admin account | | | |
| new CP approved | | CP List Sorting | |
| new RSS approved | | | |
| · Personal Information Management | | | |
| · Personal Management | | | |

| Group1 | Group1 | Group1 |
|---|---|---|

Total ǀ A ǀ B ǀ C ǀ D ǀ E · F ǀ G ǀ H ǀ I ǀ J ǀ K ǀ L ǀ M ǀ N ǀ O · P · Q ǀ R · S ǀ T ǀ U ǀ V ǀ W · X ǀ Y ǀ Z ǀ etc ☐ Select All

| ☐ Name (ID) | Post | Tel | E-mail |
|---|---|---|---|
| ☐ Administraition | Development | 000-000-0000 | Xfiniti@com.com |
| ☐ Administraition | Development | 000-000-0000 | Xfiniti@com.com |
| ☐ Administraition | Development | 000-000-0000 | Xfiniti@com.com |
| ☐ Administraition | Development | 000-000-0000 | Xfiniti@com.com |
| ☐ Administraition | Development | 000-000-0000 | Xfiniti@com.com |
| ☐ Administraition | Development | 000-000-0000 | Xfiniti@com.com |
| ☐ Administraition | Development | 000-000-0000 | Xfiniti@com.com |

1 ǀ 2 ǀ 3

[Group move]

| Logo | | | Board ǀ history ǀ admin management ǀ logout |
|---|---|---|---|

CP edit   CP add   RSS add    RSS [        ]  search ▼

| CP | Category | Time | CP | RSS | Category |
|---|---|---|---|---|---|

- CP List
  - CNN
    - Top Stories(23)
    - World(22)
    - U.S.(10)
    - Politics
    - Law
    - Technology
    - Science & Space
    - Health
    - Entertainment
    - Travel
    - Education
    - Video
    - Offbeat
  - Reuters
  - AP
  - FOX Sports

* RSS

RSS address input [        ] [confirm]
add RSS  ex) http://rss.cnn.com/rss/cnn.rss UP date period    [00:00 ▼]    [sec ▼]
Category setting  [CNN ▼]      [sports ▼]

[confirm]

| ☐ | RSS address | modification |
|---|---|---|
| ☐ | | |

[+ add] [- delete]

[Pause] [Approval request] [Alert]

[Figure 19]

| NO | FIELD |
|---|---|
| 1 | CATEGORY |
| 2 | CHANNEL NAME |
| 3 | URL |
| 4 | CP NAME |
| 5 | UPDATE PERIOD |
| 6 | CURRENT STATE |
| 7 | REGISTRATION DATE |
| 8 | APPROVAL DATE |
| 9 | INTERRUPTION DATE |
| 10 | FINAL UPDATE DATE |

[Figure 20]

| NO | FIELD |
|---|---|
| 1 | CATEGORY |
| 2 | CHANNEL NAME |
| 3 | URL |
| 4 | CP NAME |
| 5 | CURRENT STATE |
| 6 | FINAL UPDATE DATE |
| 7 | EFFECTIVE DATE(FILE 1,2,3,..TEXT) |

[Figure 21]

| NO | FIELD |
|---|---|
| 1 | ID |
| 2 | NAME |
| 3 | TITLE |
| 4 | DESCRIPTION |
| 5 | REGISTRATION DATE |
| 6 | CLASSIFICATION |
| 7 | Hit |

[Figure 22]

| NO | FIELD |
|---|---|
| 1 | ID |
| 2 | ACTION |
| 3 | QUERY VALUE |
| 4 | LOG DATE |

[Figure 23]

METHOD FOR EXTRACTING CONTENT, CONTENT EXTRACTION SERVER BASED ON RSS AND APPARATUS FOR MANAGING THE SAME AND SYSTEM FOR PROVIDING STANDBY SCREEN OF MOBILE COMMUNICATION TERMINAL USING THE SAME

TECHNICAL FIELD

The present invention relates to a method for extracting a content, a content extraction server based on RSS and an apparatus for managing the same and a system for providing a standby screen of a mobile communication terminal using the same, and in particular, to a content extraction server and a method for extracting a content wherein only a update information is provided using a RSS application, a content management server based on the RSS including the content extraction server to display the update information on the standby screen of the mobile communication terminal and a method for managing the same, and an apparatus for managing the content management server and a content update system using the same.

BACKGROUND ART

Recently, a large amount of information is shared through a rapid progress of the Internet. Accordingly, an incident happening on the opposite side of the globe may be viewed in real time due to an extraordinary expandability of the Internet. Various content providers provide informations and contents on the Internet to generate a new profit with a popularization of the Internet. Various informations and contents provided by the various content providers are updated to a new information from moment to moment, and a user connects to a site of the content providers to obtain the updated information. While the user desires only the updated information, the user must download both the updated and an outdated informations provided from the content providers. A RSS application has been proposed to satisfy the desire of the user. RSS, an abbreviation of a RDF Site Summary or a Rich Site Summary, refers to a data format based on an XML in order to easily provide the update information to the user in an often updated web site such as a news site or a blog. In accordance with the RSS scheme, the RSS application checks and downloads the update information without visiting the site to find the updated information when an address provided the site is registered to the RSS application. The RSS scheme is recognized as an international standard, and a generation of various applied business is expected to use the RSS scheme. Accordingly, a development of various service systems and methods having the RSS scheme applied is needed.

DISCLOSURE

Technical Problem

It is an object of the present invention to provide a standby screen providing system of a mobile communication terminal based on a RSS wherein a RSS feed is collected from a content server providing the RSS feed, and the collected RSS feed is processed to comply with a data format and a size of the mobile communication terminal to be provided to a standby screen of the mobile communication terminal so that a user of the mobile communication terminal may easily view a desired update content at a desired time.

In accordance with the embodiment of the present invention, it is an object of the present invention to provide a standby screen providing system of a mobile communication terminal based on a RSS comprising a content server providing an update content consisting of the RSS feed, a content management server for analyzing and classifying the update content collected from the content server and extracting a required tag to be converted to the size and the data format applicable to a receiving terminal, a database for storing the converted content, and an update content server for transmitting the converted content from the database to a designated terminal such that the update content is adaptively provided to various terminal.

In accordance with the embodiment of the present invention, it is an object of the present invention to provide a standby screen providing system of a mobile communication terminal based on a RSS feed wherein the terminal converts the size and the data format of the update content consisting of the RSS feed that may be applied to the various terminals that may establish a communication channel such as a mobile communication terminal, a wireless terminal and a ubiquitous network terminal so that a suitable update content may be provided to the mobile communication terminal as well as a computer terminal connected to the Internet.

In accordance with the embodiment of the present invention, it is an object of the present invention to provide a content extraction server and an extraction method wherein a content management server collects an update content consisting of the RSS feed, and a size and a data format of the extracted content are converted and provided according to a characteristic of a receiving terminal so that an update information provided by a content server on a network such as the Internet may be efficiently provided to users of different networks such as a mobile communication.

In accordance with the embodiment of the present invention, it is an object of the present invention to provide a content extraction server and an extraction method wherein a collected content is classified into a first content pattern including a contention a description field, a second content pattern for extracting a content based on a position of a title, a third content pattern wherein a predetermined score is given to various tags and the content is extracted from the tag that has obtained a score of more than a predetermined value, and a fourth content pattern for extracting the tag by directly dragging the collected content so that a update content collecting and analyzing step is simplified and specialized by arranging the update content according to a more universal and generalized format in a classification and an analysis of the update content.

In accordance with the embodiment of the present invention, it is an object of the present invention to provide a management apparatus for managing the content extraction server wherein an administrator and a content server that provides an update content are registered, modified and deleted in the content management server.

Technical Solution

In order to achieve the above-described object, there is provided a system for providing a standby screen of a mobile communication terminal based on a RSS, the system comprising: at least one content server for providing an update content consisting of a RSS feed; a content extraction server for collecting, analyzing and classifying the update content to form a mobile content by converting at least one of a size and a data format thereof; a database for storing the mobile content; and a standby screen providing server for providing the mobile content stored in the database to the mobile communication terminal, wherein the content extraction server comprises a RSS aggregator for collecting the update content consisting of the RSS feed, a content aggregator for partially extracting a tag of the update content, and a content transcoder for converting at least one of the size and the data format to form a user content so as to be applicable to the mobile communication terminal having the extracted tag transmitted thereto.

There is also provided a content extraction server based on a RSS, the server comprising: a RSS aggregator for collecting an update content consisting of a RSS feed; a content aggregator for partially extracting a tag of the update content; and a content transcoder for converting at least one of a size and a data format to form a user content so as to be applicable to a terminal having the extracted tag transmitted thereto.

There is also provided a method for extracting a content based on a RSS, the method comprising: (a) collecting an update content consisting of a RSS feed; (b) partially extracting a tag from the update content; and (c) converting at least one of a size and a data format of the tag so as to be applicable to a terminal having the extracted tag transmitted thereto.

There is also provided a content extraction server management apparatus based on a RSS, the apparatus comprising: a content extraction server for collecting, analyzing and classifying an update content to form a user content by converting at least one of a size and a data format thereof; and an administration module for managing the content extraction server, wherein the administration module comprises an administrator module for an administrator, a CP management module for managing the content server, a RSS channel/content management module, and a board/history module.

Advantageous Effects

As described above, in accordance with the standby screen providing system of the mobile communication terminal based on the RSS of the present invention, a RSS feed is collected from a content server providing the RSS feed, and the collected RSS feed is processed to comply with a data format and a size of the mobile communication terminal to be provided to a standby screen of the mobile communication terminal so that a user of the mobile communication terminal may easily view a desired update content at a desired time, thereby increasing a customer satisfaction.

In accordance with the content extraction server and the extraction method of the present invention, the content management server collects an update content consisting of the RSS feed, extracts a content from the update content, converts a size and a data format of the extracted content according to a characteristic of a receiving terminal and provide the same so that an update information of a content server on a network such as the Internet may be efficiently provided to users of different networks such as a mobile communication.

In accordance with the content extraction server and the extraction method of the present invention, a collected content is classified into a first content pattern including a content in a description field, a second content pattern for extracting a content based on a position of a title, a third content pattern wherein a predetermined score is given to various tags and the content is extracted from the tag that has obtained a score of more than a predetermined value, and a fourth content pattern for extracting the tag by directly dragging the collected content so that an update content collecting and analyzing step is simplified and specialized by arranging the update content according to a more universal and generalized format in a classification and an analysis of the update content.

In accordance with the management apparatus for managing the content extraction server of the present invention, an administrator and a content server that provides an update content are registered, modified and deleted in the content management server.

The standby screen providing system of the mobile communication terminal based on the RSS in accordance with the present invention comprises a content server providing the update content consisting of the RSS feed, a content management server for analyzing and classifying the update content collected from the content server and extracting a required tag to be converted to the size and the data format applicable to a receiving terminal, a database for storing the converted content, and an update content server for transmitting the converted content from the database to a designated terminal such that the update content is adaptively provided to various terminal.

In accordance with the standby screen providing system of the mobile communication terminal based on the RSS feed of the present invention, the terminal converts the size and the data format of the update content consisting of the RSS feed that may be applied to the various terminals that may establish a communication channel such as a mobile communication terminal, a wireless terminal and a ubiquitous network terminal so that a suitable update content may be provided to the mobile communication terminal as well as a computer terminal connected to the Internet.

DESCRIPTION OF DRAWINGS

FIG. 2 is a configuration diagram illustrating a content flow transmitted between components.

FIG. 3 is flow diagram illustrating an analysis and a classification of an update content of a content aggregator based on various pattern standards.

FIG. 7 is a screen configuration diagram illustrating a third content pattern.

FIG. 8 is a screen configuration diagram illustrating a fourth content pattern.

FIG. 9 is a flow diagram illustrating an operation method of a content extraction server based on a RSS in accordance with a preferred embodiment of the present invention.

FIG. 10 is a configuration diagram illustrating a management apparatus of a content extraction server based on a RSS in accordance with a preferred embodiment of the present invention.

FIG. 11 is a diagram illustrating a field inputted to an administrator input table.

FIG. 12 is a diagram illustrating a screen wherein a required input field of an administrator input table is displayed.

FIG. 13 is a configuration diagram illustrating a field that belong to a administrator privilege.

FIG. 14 is a diagram illustrating a field inputted to a CP input table.

FIG. 15 is a diagram illustrating a screen wherein a required input field of a CP input table is displayed.

FIG. 16 is a diagram illustrating a screen wherein a CP list is sorted in an ascending order.

FIG. 17 is a diagram illustrating a screen configured to include a RSS channel management field.

FIG. 18 is a diagram illustrating a field inputted to a RSS channel input table.

FIG. 19 is a diagram illustrating a field inputted to a content input table.

FIG. 20 is a diagram illustrating a field inputted to a board input table.

FIG. 21 is a diagram illustrating a screen configured to include a board field.

FIG. 22 is a diagram illustrating a field inputted to a history input table.

FIG. 23 is a configuration diagram illustrating a content update system based on a RSS in accordance with a preferred embodiment of the present invention.

BEST MODE

The above-described objects and other objects and characteristics and advantages of the present invention will now be described in detail with reference to the accompanied drawings.

Figure 1:
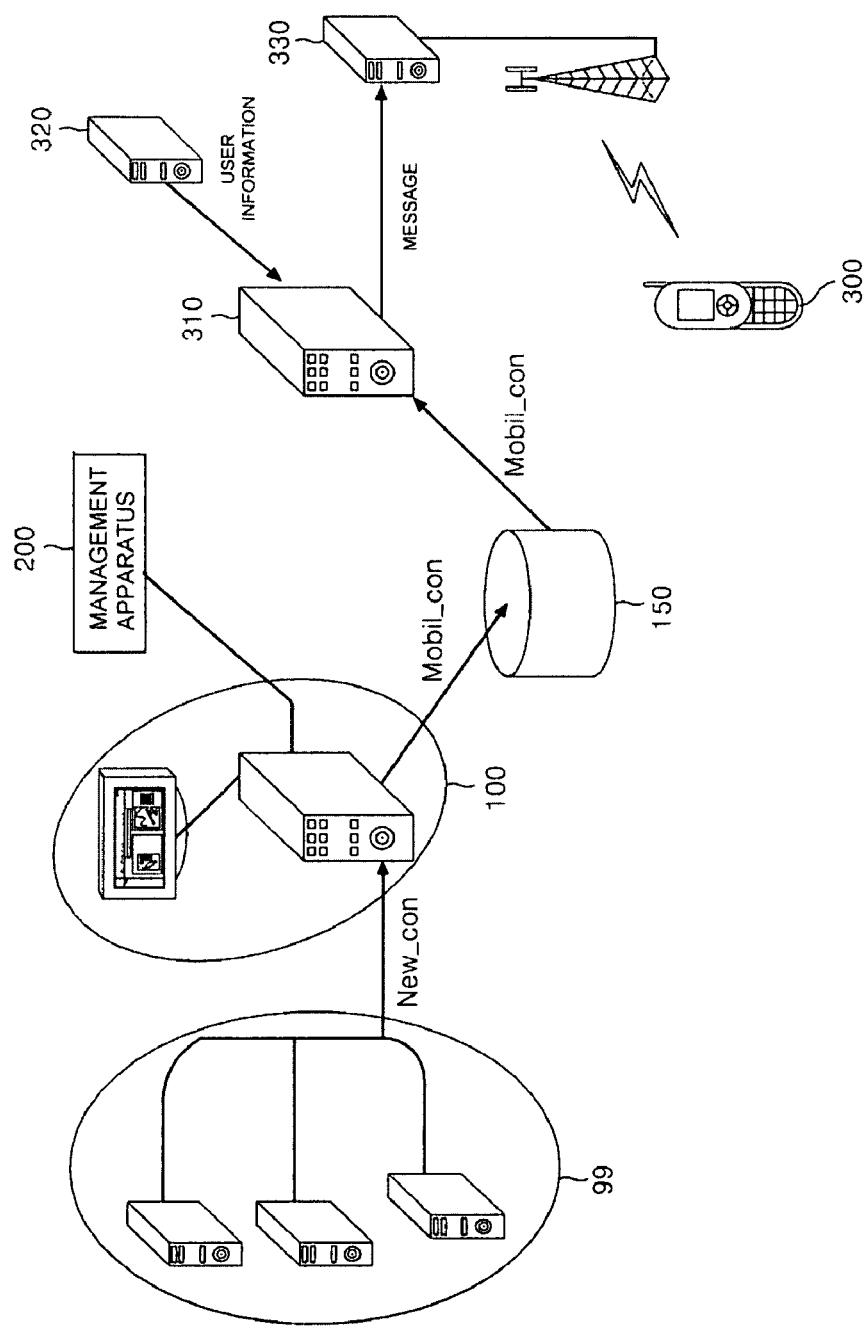
FIG. 1 is a configuration diagram illustrating a content extraction server based on a RSS in accordance with a preferred embodiment of the present invention.

FIG. 1 is a configuration diagram illustrating a standby screen providing system of a mobile communication terminal based on a RSS in accordance with a preferred embodiment of the present invention.

The standby screen providing system of the mobile communication terminal based on the RSS comprises at least one content server 99, a content extraction server 100, a database 150, and a standby screen providing server 310, and preferably further comprises a content extraction server management apparatus 200, a mobile communication terminal user information server 320 and a message server 330.

The content server 99, the content extraction server 100, the database 150 and a content extraction server management apparatus 200 will be described with reference to FIGS. 3 through 24 later. On the other hand, each of components may be embodied separately as shown, or as a single integrated system.

The standby screen providing server 310 provides a wireless internet push and pull message management solution in order for each function to have an optimized connection characteristic, and the standby screen providing server 310 may comprise a standby screen control system, a content extraction server, a PDM server, a CRM server, an advertisement server and a pull data controller.

The standby screen control system comprises a data viewer, a configuration manager, a display manager, an event handler, a push data manager, the pull data manager, a data interface module, a administration manager, a scheduler, a push agent, a pull agent, a user profile simulator, a user profile manager, a data formatter & utility, a information match maker, a contents server gateway, and a database.

The standby screen providing server 310, the mobile communication terminal user information server 320 and the message server 330 in the standby screen providing system of the mobile communication terminal based on the RSS are identical or similar to those disclosed in Korean Patent Application No. 2004-7006278 filed by the Applicant. Therefore a detailed description thereof is omitted. However, in accordance with the standby screen providing system of the present invention, the message server 330 may carry out a function of a multimedia message server that can transmit a multimedia message to the mobile communication terminal in addition to a function of a short message server.

The standby screen providing system of the mobile communication terminal based on the RSS may display a updated information of an information requested by a user on a standby screen of the mobile communication terminal, and eliminates a need for a separate surfing or search process for obtaining an update information, such that more information may be provided to the user faster and easier to improve a customer satisfaction.

MODE FOR INVENTION

FIG. 2 is a configuration diagram illustrating the content extraction server based on the RSS in accordance with the embodiment of the present invention, and FIG. 3 is a diagram illustrating a flow of a signal transmitted between components of the content extraction server based on the RSS in accordance with the embodiment of the present invention.

The content extraction server 100 comprises a RSS aggregator 110, a content aggregator 130 and a content transcoder 140, and preferably comprises an update scheduler 120, the database 150 and a display module 160. The RSS aggregator 110 collects the update content New_con consisting of the RSS feed provided from the at least one content server. The update content New_con should be manufactured based on an XML that provides the RSS feed and supports the RSS. When t the update content New_con supports the RSS, the RSS aggregator 110 connects to the content server to collect the update content New_con including the RSS feed that supports the RSS provided form the content server. In order to achieve this, the RSS aggregator 110 establishes a communication channel with the content server. The communication channel may be adaptively established for the Internet connected via a network, a wireless network connected via wireless LANs, a ubiquitous network connected via a ubiquitous. The RSS aggregator 110 may be manufactured to be synchronized to the content server, and the RSS aggregator 110 may be distributed directly by the content server or distributed by a separate storing device. In addition, the RSS aggregator 110 collects the update content New_con and classifies the same into a suitable form. The RSS aggregator 110 may support an entire versions of the RSS and an ATOM currently released in order to convert the update content New_con into mobiles contents Mobil_con1, Mobil_con2, and so on. The RSS aggregator 110 may carry out a function of configuring and changing an applied format for each of RSS channels, a function of storing an entire element of a RSS file provided by the content server, and a function of storing a linked binary in case of a RSS file including an enclosure. In addition, the RSS aggregator 110 defines a RSS pattern to be substantially used according to a constitution of the element, and collects the RSS feed by a unit of a second according to an assignment of the administrator while minimizing a load.

The content aggregator 130 classifies and recognizes the collected update content New_con into a plurality of content patterns Pat_con1, Pat_con2 and so on, and partially extracts and stores a tag included in the content patterns Pat_con1, Pat_con2 and so on according to a requirement and a characteristic of a receiving terminal. The tag includes the updated content, and may include only a title and a content. The content may include an image, a video, an audio, a text and so on. It is preferable that the content aggregator 130 satisfies conditions below while extracting the content from the collected RSS feed. That is, the content aggregator 130 may extract an effective content from an original html of the RSS feed to be stored in the database 150. The original html, the effective content and the RSS file may be stored. The content aggregator 130 subdivides the pattern to prevent an issue during operation due to a pattern application, simplifies the pattern application, and prevents a manual pattern application wherein an administrator collects the content by dragging from the RSS feed so as to provide an automatic collection for the content collection. The pattern may include a basic content server pattern, a pattern for each channel and a pattern for each content, and a text of the patterns may be modified. The content aggregator 130 may carry out a function of filtering an advertisement resource as an option, a function of automatically filtering the advertisement resource, a function of previewing after applying the pattern, and a function of providing various APIs. It is preferable that a success rate of a web scraping of the content aggregator 130 is more than 90% in case of automatic web scraping. The content aggregator 130 may also carry out a function of filtering by designating and extracting a file format of the original html such as jpg, gif and text, a function of storing the filtered files in the database 150, a function of arranging the content during the storing of the effective content having a sequence identical to that of an original, and a function of restoring in case of a channel update In addition, the content aggregator 130 may carry out a function of statistics, and other functions. The function of statistics may be classified into a statistics search and classification function and a statistics field. The statistics search and classification function includes a search and classification standard so as to collect statistics according to a period, the content server and a channel. The statistics field may be classified into a first field representing a total number of the content server, the channel and the content, a second field representing a successive and a failed collection of the content, and a third field representing others. Other functions include a multi-language support function, an independent platform, a system expandability, and a system performance guaranteeing a stability and a performance.

Figure 4:
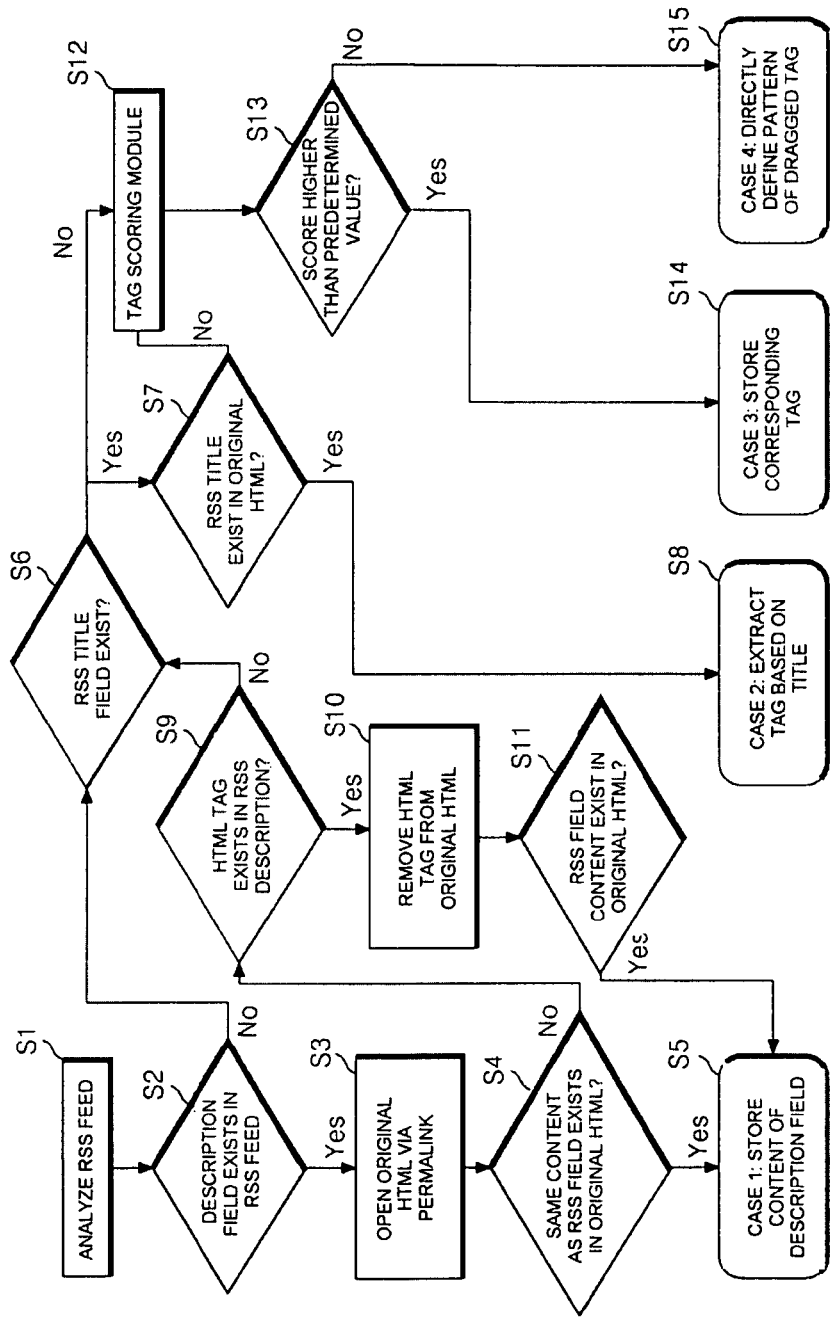
FIG. 4 is a flow diagram illustrating an order for generating a new user content of a content transcoder.

A process for extracting, analyzing and classifying the pattern using the content aggregator 130 will now be described with reference to FIG. 4. Referring to FIG. 4, the content aggregator 130 analyzes the RSS feed of the update content New_con collected from the content server by the RSS aggregator 110 (S1).

In the step S1, an inspection whether a description field exists is carried out (S2).

In the step S2, the original html is collected from the content server providing the update content New_con through a permalink when the description field exists (S3).

In the step S3, an inspection whether a content identical to the RSS description field exists in the collected original html is carried out (S4).

In the step S4, the content of the description field is classified as the first content pattern Pat_con1 when a content identical to the RSS description field exists in the collected original html (S5).

In the step S2, an inspection whether the RSS feed includes a RSS title field is carried out when the description field does not exists (S6).

In the step S6, an inspection whether the RSS title is included in the original html is carried out when the RSS feed includes the RSS title field (S7).

In the step S7, when the original html includes the RSS title, the content is extracted is based on a position of the RSS title, and the extracted content is classified as the second content pattern Pat_con2 (S8).

In the step S4, an inspection whether an html tag is included in the RSS description field is carried out when content identical to the RSS description field does not exist in the collected original html (S9).

In the step S9, when the html tag is included in the RSS description field, the html tag is removed from the original html (S10), and the step S5 is carried out when the html tag is not included in the RSS description field.

When the RSS title field does not exists in the step S6 and S7 respectively, a tag value is scored using a tag scoring module (S12).

The tag scoring module scores for a characteristic of each tag included in the original html according to various predetermined conditions so as to generate scores corresponding to each tag.

Thereafter, an inspection whether the score calculated by the tag scoring module is more than a predetermined value is carried out (S13).

In the step S13, when the score of the tag is more than the predetermined value, the corresponding tag is defined as the content and is classified as the third content pattern Pat_con3 (S14).

In the step S13, when the score of the tag is no more than the predetermined value, the administrator of the content extraction server defines the pattern and classifies the same as the fourth content pattern Pat_con4 (S15).

The first through the fourth patterns Pat_con1, Pat_con2, Pat_con3 and Pat_con4 will be described with reference to FIGS. 6 through 9.

The content transcoder 140 converts the tag extracted from each of the content patterns Pat_con1, Pat_con2, Pat_con3 and Pat_con4 classified by the content aggregator 130 into mobile contents Mobil_con1, Mobil_con2 and so on. Specifically, the mobile contents Mobil_con1, Mobil_con2 require different mobile content formats according to a characteristic of a corresponding mobile device. For instance, the data formats, sizes and amounts of the mobile contents Mobil_con1, Mobil_con2 and so on differ according to various characteristics of the terminal such as a size of an LCD, a type of a memory, a compatibility characteristic and a display capability depending on a specification of the terminal. In order to satisfy a diversity of the different mobile contents Mobil_con1, Mobil_con2 and so on, formats according to the data formats, the sizes and the amounts of the mobile contents Mobil_con1, Mobil_con2 and so on that may be applied to various mobile communication terminals are obtained in advance, and the tag extracted from the first through the fourth patterns Pat_con1, Pat_con2, Pat_con3 and Pat_con4 are converted to various mobile contents Mobil_con1, Mobil_ con2 and so on. The various converted mobile contents Mobil_con1, Mobil_con2 and so on may be stored in the database 150. On the other hand, when the user terminal requests a content that does not comply with the predetermined size and the data format, the content transcoder 140 reads the update content New_con stored in the database 150 to be converted to the mobile content that has a new size and data format. In order to achieve this, the content transcoder 140 may store the update content New_con collected by the content aggregator 130 in its original format without a conversion or the tag extracted from the update content New_con in its original format.

Figure 5:
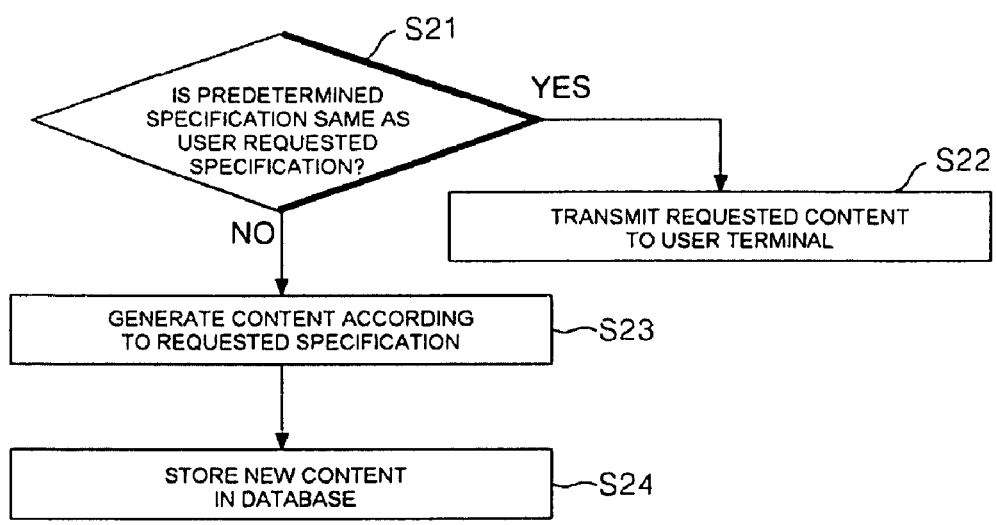
FIG. 5 is a screen configuration diagram illustrating a first content pattern.

FIG. 5 is a flow diagram illustrating a recognition, a classification and analysis of the content of the content transcoder 140. In accordance with the method, the content transcoder 140 inspects whether a specification requested by the user terminal complies with the predetermined size and the data format (S21).

In the step 21, when the specification requested by the user terminal complies with the predetermined size and the data format, an additional process is not required. The content providing server for providing an information to the user terminal transmits the content requested by the user, i.e. the mobile content Mobil_con complying with the corresponding specification stored in the database 150 to the user terminal (S22).

In the step 21, when the specification requested by the user terminal does not exists in the predetermined size and the data format, the content providing server provides a new user request specification to the content transcoder 140, and the content transcoder 140 generates a new mobile content Mobil_con that complies with the new user request specification based on the original update content New_con or the original tag stored in the database 150 (S23).

Thereafter, the generated mobile content Mobil_con is stored in the database 150.

The update scheduler 120 controls a point of time of receiving the update content by the RSS aggregator 110. More specifically, the RSS aggregator 110 establishes a communication channel with the content server at a time designated by the update scheduler 120, and collects the update content New_con through the established communication center. The RSS aggregator 110 may collect the update content New_con from the content server periodically, or when the update content New_con is generated in the content server, or at a designated time, for example when the mobile communication terminal is activated.

The database 150 stores the update content New_con collected from the content server by the content extraction server 100 to be classified, analyzed and converted from the classified the mobile content into the mobile contents Mobil_con1, Mobil_con2 and so on that is applicable to the mobile terminal. The mobile content Mobil_con includes a title representing a content title, a image according to a size definition, and a corresponding content describing the content. In addition, the database 150 may store the original update content New_con and the original tag collected from the update content New_con separately.

FIGS. 6 through 9 are configuration diagrams illustrating a first through a fourth content patterns Pat_con1, Pat_con2, Pat_con3 and Pat_con4 defined to extract the content from the update content New_con by the content aggregator 130.

Figure 6:
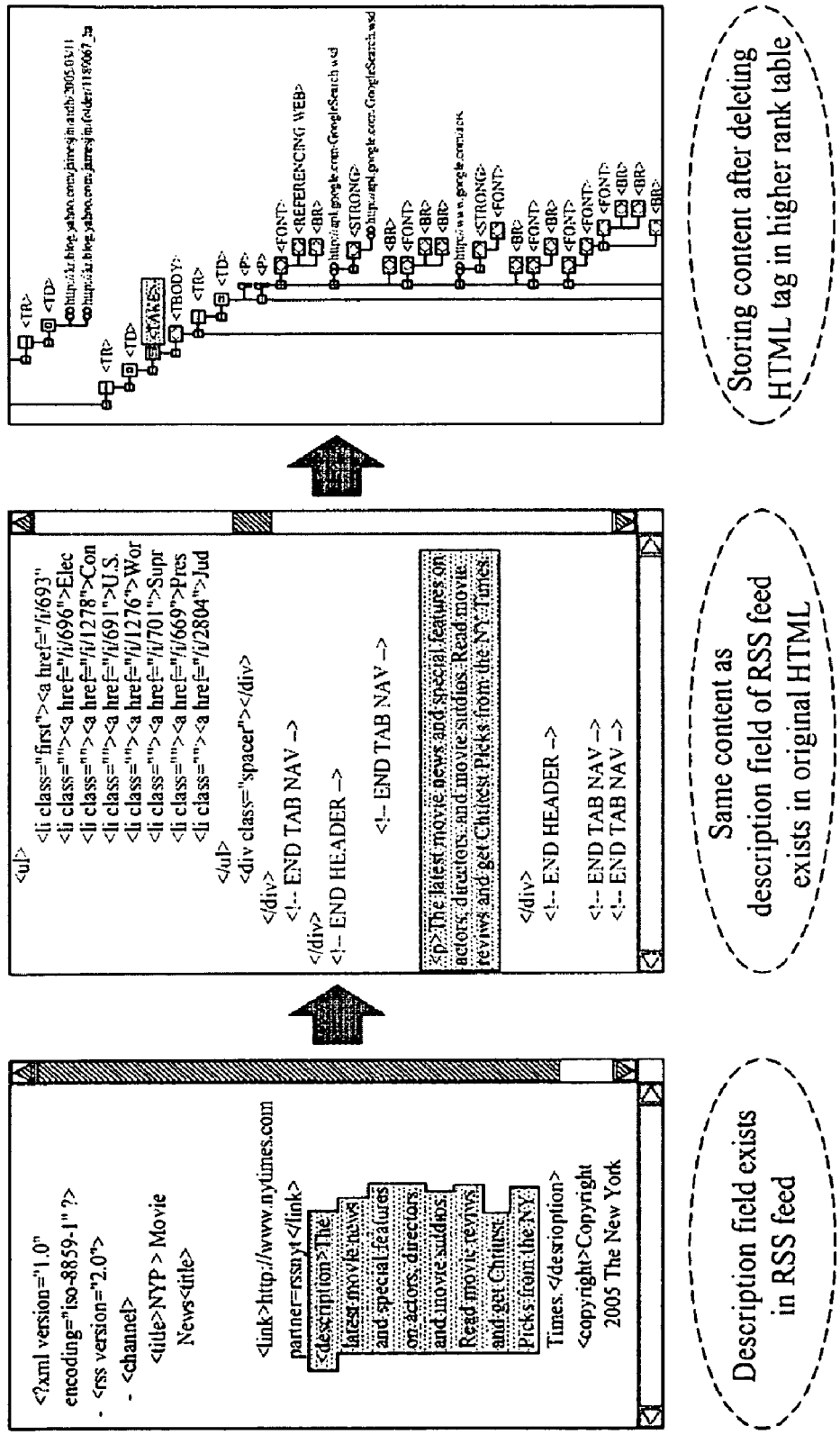
FIG. 6 is a screen configuration diagram illustrating a second content pattern.

Referring to FIG. 6, the first content pattern Pat_con1 is a pattern wherein the description field is a starting point of the content. That is, when the content of the description field of the RSS feed is identical to that of the description field in the original html, the description field is recognized and stored as the content. At this time, the description field is stored as the content after searching a higher rank table and deleting a html tag.

Referring to FIG. 7, when a content of a title field is identical to that of the original html, a main content below the title field may be determined as the second content pattern Pat_con2 considering various types of table structures. That is, since a structure of a cell distributed at the table may be represented as various types as shown in FIG. 7, a content region disposed below the title is extracted from each tag centered at the title. While FIG. 7 illustrates a case that the title and the content are arranged horizontally, the title and the content may be arranged in various ways such as a horizontal arrangement, a combination of vertical and horizontal arrangement, and a diagonal arrangement.

Referring to FIG. 8, the third content pattern Pat_con3 is defined by analyzing the tags to provide a score to each of the tags, wherein a corresponding text is determined as the content when a total is more than a predetermined value. More specifically, in accordance with the third content pattern Pat_con3 as shown, a predetermined score is granted when a width of the tag is the largest excluding the title portion by analyzing a table structure, and a predetermined score is added when the text is written in a predetermined font and has a size larger than a predetermined size. The score of each of the tags is compared and when the tag has a score more than a predetermined value, the tag is recognized and stored as the third content pattern Pat_con3.

Referring to FIG. 9, in accordance with the fourth content pattern Pat_con4, when the update content New_con does not belong to the first content pattern Pat_con1, the second content pattern Pat_con2 and the third content pattern Pat_con3, the administrator of the content extraction server 100 may designate the tag directly, extract the tag and store the extracted tag in the database 150. Specifically, the fourth content pattern Pat_con4 employs a scheme wherein the tag of a portion dragged by the administrator from the update content New_con, generates the pattern for the corresponding content server, and the pattern for the corresponding content server already generated when the content for the corresponding content server is collected is applied. To summarize, the fourth content pattern Pat_con4 is defined by defining the content included in the update content New_con as a new predetermined pattern and extracting the content from the content server according to the defined pattern.

FIG. 9 is a flow diagram illustrating a method wherein the update content is stored in the database 150 using the content extraction server based on the RSS. In accordance with an operation method of the content extraction server based on a RSS, the RSS aggregator 110 collected the RSS feed from the content server (S31).

Thereafter, the RSS feed is classified into the four content patterns Pat_con1, Pat_con2, Pat_con3 and Pat_con4 and the tag is partially extracted from the classified four content patterns Pat_con1, Pat_con2, Pat_con3 and Pat_con4.

Thereafter, the content transcoder 140 converts the tag extracted by the content aggregator 130 to the user content, the mobile content Mobil_con1, Mobil_con2 and so on for example, so as to be applicable to a mobile size (S33).

Thereafter, the update scheduler 120 determines the point of time at which the RSS aggregator 110 collects the RSS feed from the content server (S34).

Finally, the user content converted by the content transcoder 140, i.e. the mobile content Mobil_con1, Mobil_con2 and so on is stored in the content transcoder 140.

On the other hand, while converting the update content New_con to the mobile content Mobil_con1, Mobil_con2 and so on by the content transcoder 140 so as to be applicable to the mobile is described, the update content New_con may be converted to the user content that is applicable to various communication terminals.

FIG. 11 is a configuration diagram illustrating a management apparatus of the content extraction server 100 based on a RSS in accordance with the embodiment of the present invention. The management apparatus of the content extraction server 100 comprises an administrator module 210 for an administrator, a CP (Contents Provider) management module 220 for managing the content server, a RSS channel and content management module 230, and a board/history module 240.

The administration module 210 includes an "add administrator" field, an "approve administrator" field, an "administrator input table" field, and an "administrator privilege" field.

In accordance with the "add administrator" field, entire administrators are added as the administrator through an entry process except the first administrator. That is, the CP is one of the administrators having different privileges.

In accordance with the "approve administrator" field, every administrator uses his or her administrative function after the entry process and the approval of the first administrator. The first administrator has a system administrator privilege and has a highest rank. The highest ranking administrator may designate which fields are a required field which requires an approval and a non-required field which does not require the approval as an automatic approval. A default is the required field without the automatic approval.

As shown in FIG. 12, the "administrator input table" field is a table wherein an ID, a password, a name, a post and group, a telephone number, a mobile phone number, an email, a rank, a registration date, a secession data, and an approval date are stored. As shown in FIG. 13, the ID, the password, the name, the post and group, the telephone number, and the email are designated as the required fields. The post and group is selected from a predetermined group by the administrator.

As shown in FIG. 14, the "administrator privilege" field includes an account management field, a group management field, a CP management field, a RSS channel management field, a content management field, a category management field, a pattern field, a board field, a history field, and a privilege management field. In accordance with the "administrator privilege" field, a separate privilege is provided by adding a rank and providing a privilege to the rank, and the privilege is provided to the group and the individuals by providing a rank while the separate privilege is not provided thereto. The administrator generates the rank according to the privilege, and a configuration and a change of the privilege may be executed by combining each off the separate privilege.

The CP management module 220 includes an "add CP" field, an "approve CP" field, a "CP input table" field, a "CP privilege" field, a "CP list" field, and a "search" field.

The "add CP" field separately provides a CP entry interview so that a CP may join directly. The CP may be added by the administrator. The CP may be added by an application and an approval. However, the CP is automatically approved when the administrator adds the CP.

In accordance with the "approve CP" field, the CP may be approved by the administrator having an approval privilege, and is approved automatically in case of the administrator.

The "CP input table" field includes a CP account field, a password field, a company name field, a representative phone number field, a nationality field, a company address field, a content name field, a web site field, a connection name field, a person in charge contact information field, a person in charge mobile phone field, an email field, a description field, a registration date field, an expiration data field, and a current state field, wherein the CP account field, the password field, the company name field, the representative phone number field, the nationality field, the company address field, the content name field, the web site field, the connection name field, the person in charge contact information field, and the email field are required, and the CP account field, the password field, the company name field, and the representative phone number field are required in case of a registration by the administrator. The registration date is automatically entered, a term of a contract may be set by the CP and the administrator, and the RSD feed of a corresponding CP that is not within a term of a service of the CP, i.e. from the registration date to the expiration late.

The CP privilege is based on a privilege set by the administrator, and the CP basically has CP information change privilege. That is, it is preferable that only the password, the connection name, the person in charge contact information field the person in charge phone information field, the email field and the description of the input table are modifiable when the CP wishes to change the CP information.

In accordance with the "CP list" field, a default sorting scheme is an alphabetical order or an ascending order as shown in FIG. 17. English letters take precedence, and a sorting by the registration is also possible. It is preferable that the CP account field, the company name field, the content name field, and the current state field of the CP input table are assigned as the required fields. It is preferable that a detailed page function for showing the list field displays the entire field of the CP input table, and a currently registered channels list is shown.

A search allows an "and" and "or" searches.

The RSS channel and content management module 230 includes a RSS channel management field, a RSS channel input table field, a RSS channel list field, a RSS channel state field, a content input table field, a content list field, a search field, and an automatic backup field.

As shown in FIG. 18, the RSS channel management field has a function of a registration, a function of preview in case of the registration, a function of applying and changing a pattern, a function of setting and changing a period, a function of a modification, a function of a deletion, a function of an approval, a function of a temporary interruption, a function of a setting a updating period, and a function of a warning. The registration refers to a registering a channel, the deletion refers to refers to moving the channel to a trash can and the channel moved to the trash can may be restored by the administrator. The approval refers to requesting an approval for the registered and modified channels by the administrator or the CP, and the approved channel is collected according to a predetermined period. The approval may be classified into "approval required" and "approval not required" so that the approval process may be omitted. The temporary interruption refers to temporary interrupting a supply of the channel and the content by the administrator and the CP, and the temporary interrupted channel and content are not collected and not stored in the database. The update period may be set by a unit of a second, a minimum update period may be set by the administrator, and a setting of a category is simultaneously carried out. The warning refers to an alarming when a technical difficult occurs or an ineffective content is collected.

As shown in FIG. 19, the RSS channel input table field includes a category field, a channel name field, a ULR field, a CP name field, an update period field, a current state field, a registration date field, a verification date field, an interruption date field, and a final update completion field.

In accordance with the RSS channel list field, an entire channel list is sorted in an alphabetical order, a CP order or a channel registration order. A sorting method after selecting the category may be similar. It is preferable that the channel name field, the CP name field and the current state field are required fields to be displayed for a list field, and other fields may be optional. It is preferable that a detailed page field for the list field displays an entire field of the RSS channel input table. The RSS channel list may display a state of the content being updated without a reloading.

The RSS channel state field may include an "update in progress" state, an "in service" state, a "temporarily interrupted" state and an "under test" state. The update is automatically carried out, and may include a "currently collecting" step, a "web scraping" step, and a "storing in database" step. The "in service" state refers to a channel service being in progress automatically or by a setup by the administrator. The "temporarily interrupted" state and the "under test" state are set by the administrator separately.

As shown in FIG. 20, the content input table field includes a category field, a channel name field, a URL field, a CP name field, a current state field, a final update completion field and an effective content field.

In accordance with the content list, a separate page may be allocated so that the entire content list may be viewed. In accordance with a method for sorting the content list, a default may be by an updated order, and by the CP additionally. The sorting by the CP displays the list in an alphabetical order, and it is preferable that English letters take precedence since English and Korean letters may be combined. The content list is sorted according to the channel within the sorting by the CP, and the channels are sorted in alphabetical order. The channel list may display a state of the content being updated without a reloading.

The search field may include a channel search and a content search, each search may be carried out according to a period and AND and OR for the field.

In accordance with the automatic backup field, at least one of the entire channel and the content is automatically backed up at a predetermined point of time or a predetermined period such as three months. The system operator may access and search via a menu such as a "view previous data" and a web.

The board/history module 240 includes the board field and the history field.

The board is a type of an electronic memo having a characteristic of an operation record wherein a note may be written when the administrator or the system operator modifies the database. The board input table includes an ID field, a name field, a title field, a description field, a registration date field, a classification field, and a hit field. It is preferable that the administrator and the system operator are allowed to write only the description field. The board list is generated as a reply such as "[class] title (hit) date description", and an integrated board is similar to a general board as shown in FIG. 22, and the field No., title, name, ID and date are displayed. It is preferable that the entire field of the board input table is displayed in the detailed page of the integrated board. A method for sorting the integrated board may include a sorting by date, and AND and OR searches may be carried out for entire field of the board input table. The integrated allows "read", "write", "delete" and "modify".

The history displays an entire log in a form of a board generated during a use of the content extraction server by the administrator or the system operator. Therefore, a problem may be promptly solved when the problem occurs. As shown in FIG. 23, the history input table includes an ID field, an action field, a query field and a log date field. The history is generated when an activity occurs in the database, and a history list is sorted according to a date of the log. It is preferable that the history list field displays three fields except a query value in the history input table, and the entire field is displayed in the detailed page. AND and OR searches may be carried out except the query value.

Figure 24:
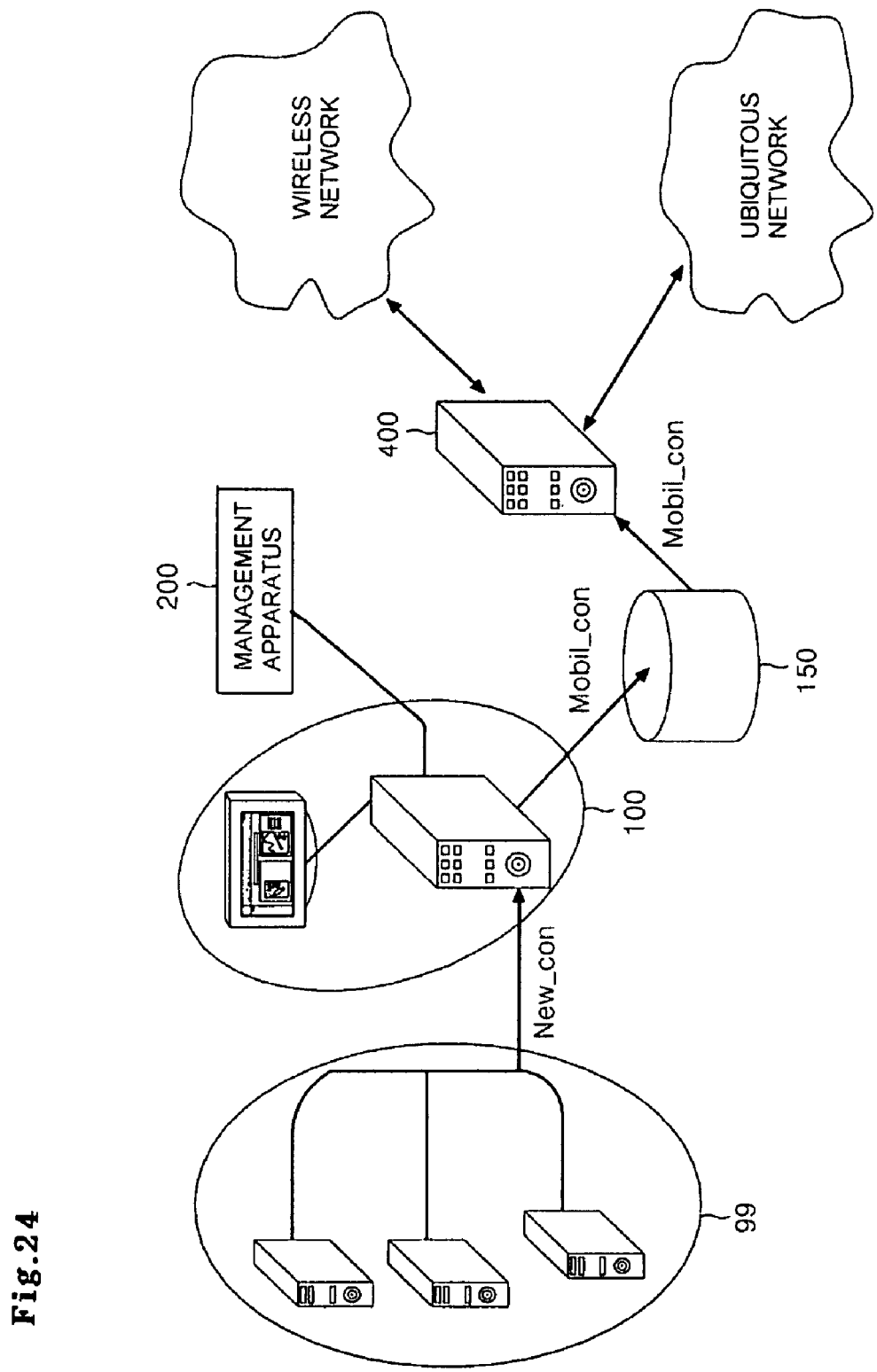
FIG. 24 is a configuration diagram illustrating a content update system based on a RSS in accordance with another preferred embodiment of the present invention.

FIG. 24 is a configuration diagram illustrating a content update system based on a RSS in accordance with another preferred embodiment of the present invention. The content update system based on the RSS comprises at least one content server 99, a content extraction server 100, a database 150, and an update content providing server 400.

In accordance with the content update system based on the RSS, since a constitution other than a content transcoder, the update content providing server 400 of the content extraction server 100 are identical to a previously described constitution, a detailed description is thereby omitted.

The content transcoder converts the content collected from the content server and then analyzed and classified into a data format to be transmitted to a wireless terminal and a network terminal connected to a wireless network and a ubiquitous network. For instance, in case of a wireless notebook, the update content New_con collected from the Internet may be transmitted without any conversion, and in case of a wireless PDA, the content transcoder converts the content to a size suitable for the PDA to be stored in the database. In case of terminals connected to the ubiquitous network such as a refrigerator, a washer, a car, a stereo and a copier, the content transcoder converts the information requested by the user of the terminal to a data applicable to the each of the terminals to be stored in the database. The terminals connected to the ubiquitous network such as the refrigerator and the washer automatically receives a software to be updated from the content extraction server 100 for an upgrade and an update through the above described method.

The update content providing server 400 provides an information required by the wireless terminal and the ubiquitous network terminal that require an update data and an update software or a patch while being connected to the wireless network and the ubiquitous network. The information is an information obtained by processing the update content New-_con collected by the content extraction server 100 from the content server 99 to be applicable to the wireless terminal and the ubiquitous network terminal so as to be suitable for the wireless terminal and the ubiquitous network terminal. For this, the update content providing server 400 should form a communication channel with the wireless terminal and the ubiquitous network terminal, and should be able to obtain the size and the data format of the update content that are applicable to the wireless terminal and the ubiquitous network terminal to be provided to the content extraction server 100. The content extraction server 100 that has obtained the size and the data format of the update content converts the size and the data format of the update content to be suitable for the wireless terminal and the ubiquitous network terminal, and stores the same in the database 150.

INDUSTRIAL APPLICABILITY

As described above, in accordance with the standby screen providing system of the mobile communication terminal based on the RSS of the present invention, the RSS feed is collected from the content server providing the RSS feed, and the collected RSS feed is processed to comply with the data format and the size of the mobile communication terminal to be provided to the standby screen of the mobile communication terminal so that the user of the mobile communication terminal may easily view the desired update content at the desired time, thereby increasing a customer satisfaction.

In accordance with the content extraction server and the extraction method of the present invention, the content management server collects the update content consisting of the RSS feed, extracts the content form the update content, converts the size and the data format of the extracted content according to the characteristic of the receiving terminal and provide the same so that an update information of the content server on the network such as the Internet may be efficiently provided to users of different networks such as the mobile communication.

In accordance with the content extraction server and the extraction method of the present invention, the collected content is classified into the first content pattern including the content in the description field, the second content pattern for extracting the content based on the position of the title, the third content pattern wherein the predetermined score is given to various tags and the content is extracted from the tag that has obtained the score of more than the predetermined value, and the fourth content pattern for extracting the tag by directly dragging the collected content so that the update content collecting and analyzing step is simplified and specialized by arranging the update content according to the more universal and generalized format in a classification and the analysis of the update content.

In accordance with the management apparatus for managing the content extraction server of the present invention, the administrator and the content server that provides an update content are registered, modified and deleted in the content management server.

The standby screen providing system of the mobile communication terminal based on the RSS in accordance with of the present invention comprises a content server providing the update content consisting of the RSS feed, a content management server for analyzing and classifying the update content collected from the content server and extracting a required tag to be converted to the size and the data format applicable to a receiving terminal, a database for storing the converted content, and an update content server for transmitting the converted content from the database to a designated terminal such that the update content is adaptively provided to various terminal.

In accordance with the standby screen providing system of the mobile communication terminal based on the RSS feed of the present invention, the terminal converts the size and the data format of the update content consisting of the RSS feed that may be applied to the various terminals that may establish a communication channel such as a mobile communication terminal, a wireless terminal and a ubiquitous network terminal so that a suitable update content may be provided to the mobile communication terminal as well as a computer terminal connected to the Internet.

The invention claimed is:

1. A system for providing a standby screen of a mobile communication terminal based on a Really Simple Syndication ("RSS"), the system comprising:
at least one content server for providing an update content consisting of a RSS feed;
a content extraction server for collecting, analyzing and classifying the update content to form a mobile content by converting at least one of a size and a data format thereof;
a database for storing the mobile content; and
a standby screen providing server for providing the mobile content stored in the database to the mobile communication terminal,
wherein the content extraction server comprises a RSS aggregator for collecting the update content consisting of the RSS feed, a content aggregator for partially extracting a tag of the update content, and a content transcoder for converting at least one of the size and the data format to form a user content so as to be applicable to the mobile communication terminal having the extracted tag transmitted thereto,
wherein the mobile communication terminal comprise a content extraction server administration module for managing the content extraction server; and
the content extraction server administration module comprises an administrator module for an administrator, a Contents Provider ("CP") management module for managing the content server, a RSS channel and content management module, and a board/history module.

2. The system in accordance with claim 1, further comprising a user information server for providing an user information of the mobile communication terminal, and a message server for providing the mobile content to mobile communication terminal.

3. The system in accordance with claim 1, wherein the standby screen providing server provides a wireless internet push and pull message management solution, and the standby screen providing server comprises at least one of a standby screen control system, a content extraction server, a Product Data Management ("PDM") server, a Customer Relationship Management ("CRM") server, an advertisement server and a pull data controller.

4. A content extraction server based on a RSS, the server comprising:
a RSS aggregator for collecting an update content consisting of a RSS feed;
a content aggregator for partially extracting a tag of the update content;
a content transcoder for converting at least one of a size and a data format to form a user content so as to be applicable to a terminal having the extracted tag transmitted thereto; and
a management apparatus for managing the content extraction server,
wherein the content extraction server administration module comprises an administrator module for an administrator, a CP management module for managing the content server, a RSS channel and content management module, and a board/history module.

5. The server in accordance with claim 4, wherein the content aggregator classifies the update content to
a first content pattern for determining a description field included in the RSS feed according to the extracted tag;
a second content pattern for extracting the tag according to a position of a title in the update content;
a third content pattern for allocating a score to the tag in the update content according to a predetermined standard and for extracting the tag having a score higher than a predetermined score; and
a fourth content pattern for directly extracting the tag by dragging a predetermined portion of the update content.

6. The server in accordance with claim 5, wherein the content aggregator comprises a tag scoring module for providing a score to the tag in order to classify the third content pattern and the fourth content pattern.

7. The server in accordance with claim 5, wherein the tag is at least one of a title and contents included in the update content.

8. The server in accordance with claim 4, further comprising an update scheduler for controlling a point of time of collecting the update content by the RSS aggregator.

9. The server in accordance with claim 8, wherein the point of time is at least one of a point when the update content is formed in the content server, a predetermined period determined by the content extraction server, a point when the terminal is activated.

10. The server in accordance with claim 4, wherein the terminal comprises a mobile communication terminal and wherein the user content comprises a mobile content formed to be applicable to a mobile size.

11. The server in accordance with claim 4, further comprising a database for storing at least one of the user content, the RSS feed collected by the RSS aggregator and the tag extracted from the RSS feed.

12. The server in accordance with claim 11, wherein the content transcoder, when the user content having a new size and a new data format is required, reads at least one of the RSS feed and the tag stored in the database, and converts the same to the new size and the new data format to be stored in the database.

13. The server in accordance with claim 11, wherein the management apparatus comprises an administrator authentication module for accessing the management apparatus, a content server/RSS extraction module for managing and searching the content server/RSS, a content extraction module for managing the content, an administrator extraction module for controlling a plurality of administrators and a connection module for directly connecting to the database.

14. The server in accordance with claim 13, further comprising a web application server disposed between the connection module and the database.

15. The server in accordance with claim 4, wherein the RSS aggregator carries out at least one of a function of supporting an entire version of RSS and Atom Syndication Format ("ATOM"), a function of configuring and changing an applied format for each of RSS channels, a function of storing a linked binary in case of a RSS file including an enclosure, a function of defining a RSS pattern to be substantially used according to a constitution of an element, and a function of collecting the RSS feed by a unit of a second according to an assignment of the administrator while minimizing a load.

16. The server in accordance with claim 4, wherein content aggregator carries out at least one of a function of extracting and storing an effective content of an original html in the RSS feed, a function of subdividing a pattern application so as to automation of a content collection, a function of subdividing into a basic content server pattern capable of modifying a text, a pattern according to a channel and a pattern according to the content, a function of filtering an advertisement resource, a function of previewing after applying the pattern, a function of providing various Application Programming Interfaces ("APIs"), a function of filtering by designating and extracting a file format of the original html, a function of storing the filtered file, a function of arranging the content during the storing of the effective content having a sequence identical to that of an original, a function of restoring in case of a channel update, a function of statistics, and a function of others.

17. A method for extracting a content based on a RSS, the method comprising:
   (a) collecting an update content consisting of a RSS feed using a content extraction server;
   (b) partially extracting a tag from the update content using the content extraction server;
   (c) converting at least one of a size and a data format of the tag so as to be applicable to a terminal having the extracted tag transmitted thereto using the content extraction server; and
   (d) managing the content extraction server using a content extraction server administration module,
   wherein the content extraction server administration module comprises an administrator module for an administrator, a CP management module for managing the content server, a RSS channel and content management module, and a board/history module.

18. The method in accordance with claim 17, wherein the update content is analyzed according to a first content pattern for determining a description field included in the RSS feed according to the extracted tag;
   a second content pattern for extracting the tag according to a position of a title in the update content;
   a third content pattern for allocating a score to the tag in the update content according to a predetermined standard and for extracting the tag having a score higher than a predetermined score; and
   a fourth content pattern for directly extracting the tag by dragging a predetermined portion of the update content in the step (b).

19. The method in accordance with claim 17, further comprising determining a moment of time for collecting the RSS feed.

20. The method in accordance with claim 17, further comprising storing the user content.

21. A content extraction server management apparatus based on a RSS, the apparatus comprising:
   a content extraction server for collecting, analyzing and classifying an update content to form a user content by converting at least one of a size and a data format thereof; and
   an administration module for managing the content extraction server,
   wherein the administration module comprises an administrator module for an administrator, a CP management module for managing the content server, a RSS channel/content management module, and a board/history module.

22. The apparatus in accordance with claim 21, wherein the administration module includes an "add administrator" field, a "approve administrator" field, an "administrator input table" field, and an "administrator privilege" field.

23. The apparatus in accordance with claim 22, wherein the "add administrator" field includes an identification ("ID") field, a password field, a name field, a post and group field, a telephone number field, a mobile phone number field, an email field, a rank field, a registration date field, a secession data field, and a verification date field, and wherein the ID field, the password field, the name field, the post and group field, the telephone number field, and the email field are required.

24. The apparatus in accordance with claim 22, wherein the "administrator privilege" field includes an account management field, a group management field, a CP management field, a RSS channel management field, a content management field, a category management field, a pattern field, a board field, a history field, and a privilege management field.

25. The apparatus in accordance with claim 21, wherein the CP management module includes an "add CP" field, a "approve CP" field, a "CP input table" field, a "CP privilege" field, a "CP list" field, and a "search" field.

26. The apparatus in accordance with claim 25, wherein the "CP input table" field includes a CP account field, a password field, a company name field, a representative phone number field, a nationality field, a company address field, a content name field, a web site field, a connection name field, a person in charge contact information field, a person in charge mobile phone field, an email field, a description field, a registration date field, an expiration data field, and a current state field, wherein the CP account field, the password field, the company name field, the representative phone number field, the nationality field, the company address field, the content name field, the web site field, the connection name field, the person in charge contact information field, and the email field are required, and the CP account field, the password field, the company name field, and the representative phone number field are required for the administrator.

27. The apparatus in accordance with claim 21, wherein the RSS channel/content management module includes a RSS channel management field, a RSS channel input table field, a RSS channel list field, a RSS channel state field, a content input table field, a content list field, a search field, and an automatic backup field.

28. The apparatus in accordance with claim 27, wherein RSS channel management field includes a function of a registration, a function of preview in case of the registration, a function of applying and changing a pattern, a function of configuring and changing a period, a function of a modification, a function of a deletion, a function of requesting a verification of a channel registered or modified by the administrator and a CP, a function of temporarily interrupting providing of the channel and the content by the CP, a function of configuring an update period by a unit of a second, and a function of warning when a technical difficult occurs or an ineffective content is collected.

29. The apparatus in accordance with claim 27, wherein the RSS channel input table field includes a category field, a channel name field, a Uniform Resource Locator ("URL") field, a CP name field, an update period field, a current state field, a registration date field, a verification date field, an interruption date field, and a final update completion field.

30. The apparatus in accordance with claim 27, wherein the RSS channel state field includes at least one of an update state including a current collection state, a web scraping state and a database storing state automatically carried out, a service state wherein a channel service is in progress automatically or by a setup of the administrator, and an interruption and test state for a separate configuration by the administrator.

31. The apparatus in accordance with claim 27, wherein the content input table field includes a category field, a channel name field, a URL field, a CP name field, a current state field, a final update completion field and an effective content field.

32. The apparatus in accordance with claim 21, wherein the board/history module comprises:
 a board for recording a message when an administrator or a system operator modifies a database, the board comprising an ID field, a name field, a title field, a description field, a registration date field, a classification field, and a hit field; and
 a history for displaying an entire log generated when the administrator or system operator and a CP uses the content extraction server in a form of the board, wherein an input table includes an ID field, an action field, a query field and a log date field.

* * * * *